United States Patent
Keum et al.

(10) Patent No.: US 12,506,204 B2
(45) Date of Patent: Dec. 23, 2025

(54) SECONDARY BATTERY MODULE, AND SECONDARY BATTERY PACK AND VEHICLE COMPRISING SAME

(71) Applicant: LG ENERGY SOLUTION, LTD., Seoul (KR)

(72) Inventors: Jong-Yoon Keum, Daejeon (KR); Bum Choi, Daejeon (KR); Soo-Jun Ahn, Daejeon (KR); Gae-Sung Kim, Daejeon (KR); Dong-Hwan Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 443 days.

(21) Appl. No.: 17/928,086

(22) PCT Filed: Nov. 1, 2021

(86) PCT No.: PCT/KR2021/015622
§ 371 (c)(1),
(2) Date: Nov. 28, 2022

(87) PCT Pub. No.: WO2022/098027
PCT Pub. Date: May 12, 2022

(65) Prior Publication Data
US 2023/0216121 A1 Jul. 6, 2023

(30) Foreign Application Priority Data
Nov. 5, 2020 (KR) .......................... 10-2020-0147102

(51) Int. Cl.
*H01M 50/204* (2021.01)
*H01M 10/613* (2014.01)
(Continued)

(52) U.S. Cl.
CPC ....... *H01M 50/204* (2021.01); *H01M 10/613* (2015.04); *H01M 50/193* (2021.01); *H01M 50/198* (2021.01); *H01M 2220/20* (2013.01)

(58) Field of Classification Search
CPC ............. H01M 10/613; H01M 10/643; H01M 10/6557; H01M 10/6569; H01M 2220/20;
(Continued)

(56) References Cited

U.S. PATENT DOCUMENTS

| 5,418,083 A | 5/1995 | Tamaki et al. |
| 2012/0045667 A1 | 2/2012 | Yoneda et al. |

(Continued)

FOREIGN PATENT DOCUMENTS

| CN | 102376922 A | 3/2012 |
| CN | 105742542 A | 7/2016 |

(Continued)

OTHER PUBLICATIONS

Office Action issued in corresponding Japanese Patent Application No. 2022-570387, dated Nov. 20, 2023 . (Note: JP 2006-156171 A was previously cited).

(Continued)

*Primary Examiner* — Victoria H Lynch
(74) *Attorney, Agent, or Firm* — Morgan, Lewis & Bockius LLP

(57) ABSTRACT

A secondary battery module, a secondary battery pack, and a vehicle including the same are provided. The secondary battery module includes a plurality of secondary battery cells having a battery case in which an electrode assembly and an electrolyte are accommodated; a frame member supporting the plurality of secondary battery cells; and a cover accommodating the plurality of secondary battery cells and the frame member. The plurality of secondary battery cells have a water proofing structure.

17 Claims, 7 Drawing Sheets

(51) Int. Cl.
  *H01M 50/193*   (2021.01)
  *H01M 50/198*   (2021.01)
(58) Field of Classification Search
  CPC ........... H01M 50/1245; H01M 50/141; H01M 50/143; H01M 50/193; H01M 50/198; H01M 50/204; H01M 50/213; H01M 50/289; Y02E 60/10
  See application file for complete search history.

(56) References Cited

U.S. PATENT DOCUMENTS

| | | | |
|---|---|---|---|
| 2014/0162093 A1* | 6/2014 | Reitzle | H01M 50/143 429/62 |
| 2017/0033339 A1 | 2/2017 | Watanabe et al. | |
| 2018/0248157 A1* | 8/2018 | Suzuki | H01M 50/24 |
| 2019/0081298 A1 | 3/2019 | Matecki et al. | |
| 2019/0140235 A1 | 5/2019 | Lindstrom et al. | |
| 2019/0296303 A1 | 9/2019 | Sueyoshi et al. | |
| 2020/0388805 A1 | 12/2020 | Yoo et al. | |
| 2021/0336306 A1 | 10/2021 | Matecki et al. | |

FOREIGN PATENT DOCUMENTS

| | | |
|---|---|---|
| CN | 111108015 A | 5/2020 |
| CN | 111788710 A | 10/2020 |
| JP | H07-134976 A | 5/1995 |
| JP | 2006-156171 A | 6/2006 |
| JP | 2008-047301 A | 2/2008 |
| JP | 2010-040243 A | 2/2010 |
| JP | 2011-175942 A | 9/2011 |
| JP | 2013-214354 A | 10/2013 |
| JP | 2015-106432 A | 6/2015 |
| JP | 2015-207539 A | 11/2015 |
| JP | 2016-103378 A | 6/2016 |
| JP | 2017-174792 A | 9/2017 |
| JP | 2017-208298 A | 11/2017 |
| JP | 2018-037159 A | 3/2018 |
| KR | 10-2016-0149576 A | 12/2016 |
| KR | 10-2019-0022485 A | 3/2019 |
| KR | 10-2019-0023917 A | 3/2019 |
| KR | 10-2019-0051100 A | 5/2019 |
| WO | 2018/116715 A1 | 6/2018 |

OTHER PUBLICATIONS

International Search Report (with partial translation) and Written Opinion dated Feb. 25, 2022, for corresponding International Patent Application No. PCT/KR2021/015622.

Office Action dated Nov. 1, 2025 issued in corresponding Chinese Patent Application No. 202180041635.4.

* cited by examiner

SECONDARY BATTERY MODULE, AND SECONDARY BATTERY PACK AND VEHICLE COMPRISING SAME

TECHNICAL FIELD

The present application claims priority to Korean Patent Application No. 10-2020-0147102 filed on Nov. 5, 2020 in the Republic of Korea, the disclosures of which are incorporated herein by reference.

The present disclosure relates to a secondary battery module, and a secondary battery pack and a vehicle including the same, and more particularly, to a secondary battery module capable of preventing coolant leakage, and a secondary battery pack and a vehicle including the same.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an exterior, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

Secondary batteries may be electrically connected to each other through a conductor bus bar. In general, a positive electrode lead is made of aluminum, a negative electrode lead is made of copper, and the bus bar is also usually made of copper.

Here, in an embodiment, a coolant may be used to cool secondary battery cells included in the secondary battery module, and a rubber packing may be coupled to a frame supporting the secondary battery cells to prevent leakage of the coolant, namely to secure waterproofness.

However, the method of injecting a rubber packing to the frame is expensive, and when the coolant is injected into the secondary battery module or when the waterproof function is tested, a vacuum or high pressure is formed, and the rubber packing for waterproofing is damaged by the vacuum or high pressure formed in this way, thereby damaging the secondary battery cells due to leakage of the coolant.

DISCLOSURE

Technical Problem

The present disclosure is directed to providing a secondary battery module, which may be waterproof to prevent coolant leakage and resultant damage to secondary battery cells, and a secondary battery pack and vehicle including the same.

Technical Solution

In one aspect of the present disclosure, there is provided a secondary battery module, comprising: a plurality of secondary battery cells having a battery case in which an electrode assembly and an electrolyte are accommodated; a frame member configured to support the plurality of secondary battery cells; and a cover configured to accommodate the plurality of secondary battery cells and the frame member, wherein the plurality of secondary battery cells have a water proofing structure.

Also, the water proofing structure may include a protrusion member attached to the secondary battery cell to protrude from the secondary battery cell; and a tubing member configured to surround the secondary battery cell to which the protrusion member is attached.

In addition, the tubing member may be thermally contracted after surrounding the secondary battery cell and the protrusion member, and the protrusion member may be coupled to the frame member in a fitting manner to secure waterproofing.

Also, the protrusion member may be provided at an upper side of a side surface of the secondary battery cell to surround the secondary battery cell.

In addition, a first rib may be formed at the frame member to protrude in a preset direction, and the first rib may be coupled to the cover.

Also, a protrusion may be formed on the first rib so that turbulence is generated at a coolant flowing inside the cover.

In addition, a first rib may be formed at the frame member to protrude in a preset direction, a second rib corresponding to the first rib may be formed at the cover, and the first rib and the second rib may be coupled.

Also, the water proofing structure may be made of a waterproofing resin that surrounds an upper side of the frame member.

In addition, the waterproofing resin may be made of a flame-retardant material and surround the plurality of secondary battery cells such that, when a fire occurs in any one secondary battery cell, the flame is prevented from spreading to other adjacent secondary battery cell.

Also, the waterproofing resin may be made of a phase change material (PCM) to cool the secondary battery cell.

In addition, the water proofing structure may include a tubing member configured to surround the secondary battery cell; and a waterproofing glue applied to a surface of the tubing member.

Also, the water proofing structure may include a tubing member configured to surround the secondary battery cell; and a metal member deposited on a surface of the tubing member.

In addition, the water proofing structure may include a tubing member configured to surround the secondary battery cell and formed doubly; and a metal member coupled between the doubly-formed tubing members.

Meanwhile, in another aspect of the present disclosure, there may also be provided a secondary battery pack including the secondary battery module described above, and there may also be provided a vehicle including the secondary battery module.

Advantageous Effects

Embodiments of the present disclosure have an effect of providing a secondary battery module, which is waterproof to prevent coolant leakage and resultant damage to secondary battery cells, and a secondary battery pack and vehicle including the same.

BEST MODE

Figure 1:
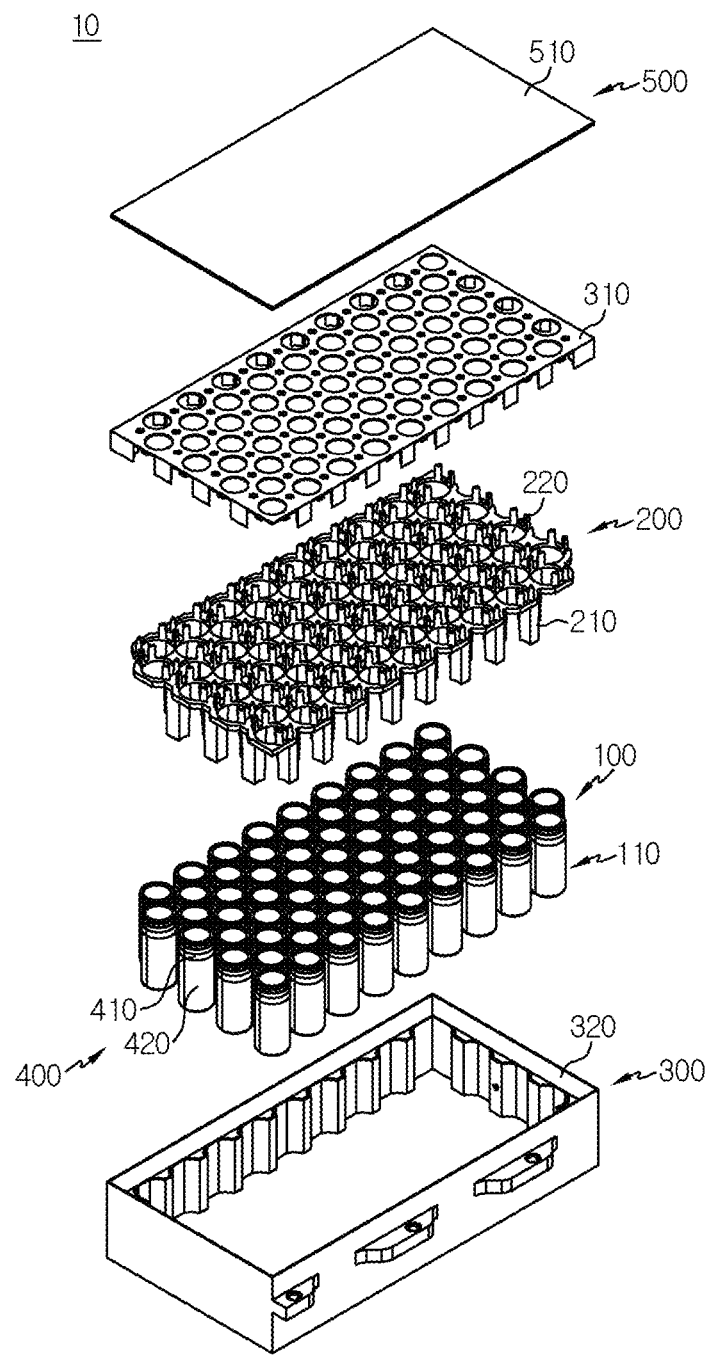
FIG. 1 is an exploded perspective view showing a secondary battery module according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'coupling' or 'connecting' as used herein, may refer not only to a case where one member and another member are directly combined or directly connected but also a case where one member is indirectly combined with another member via a connecting member or is indirectly connected.

Figure 2:
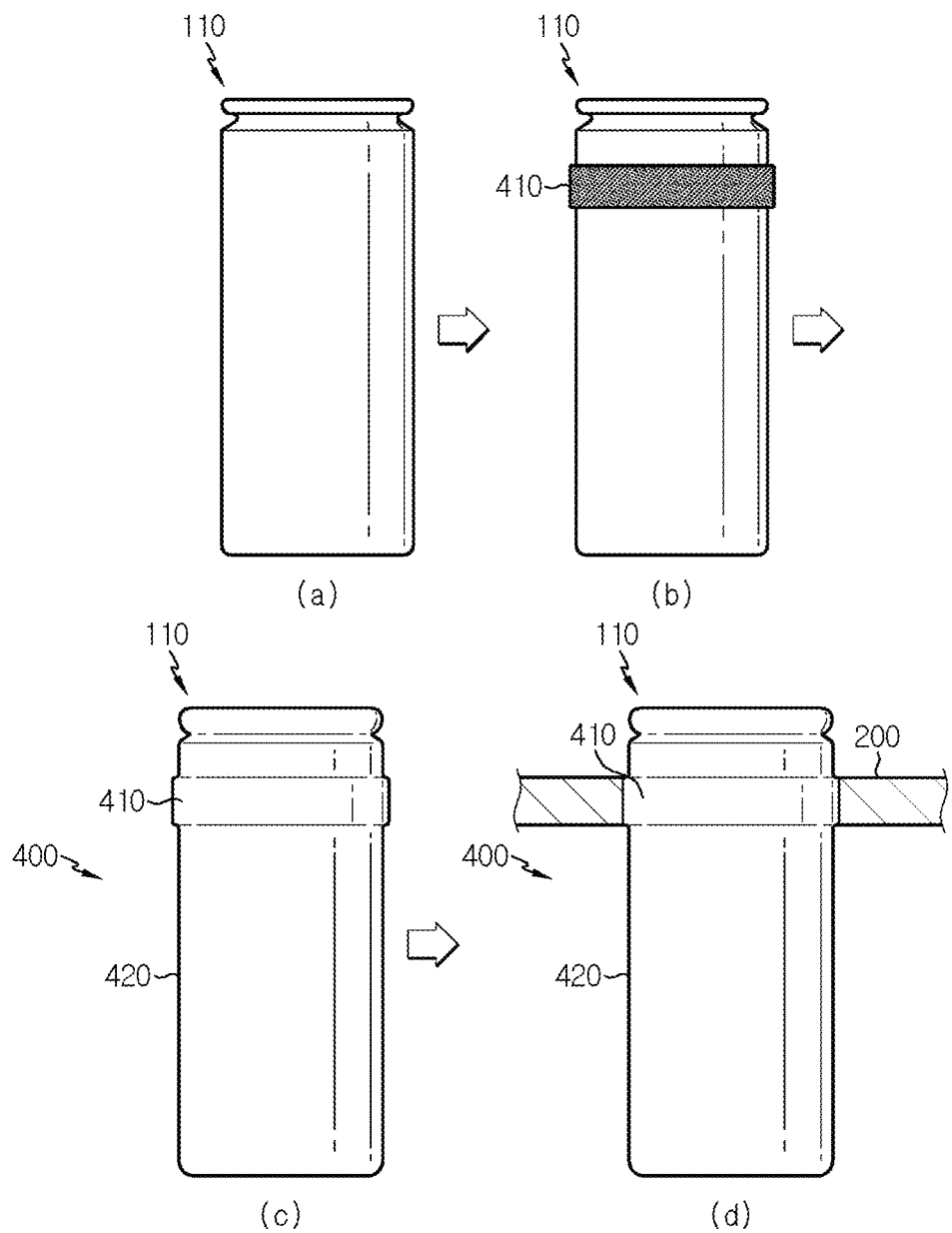
FIGS. 2(a) to 2(d) are diagrams schematically showing a process in which a protrusion member for waterproofing is formed at a secondary battery cell in the secondary battery module according to an embodiment of the present disclosure.
Figure 3:
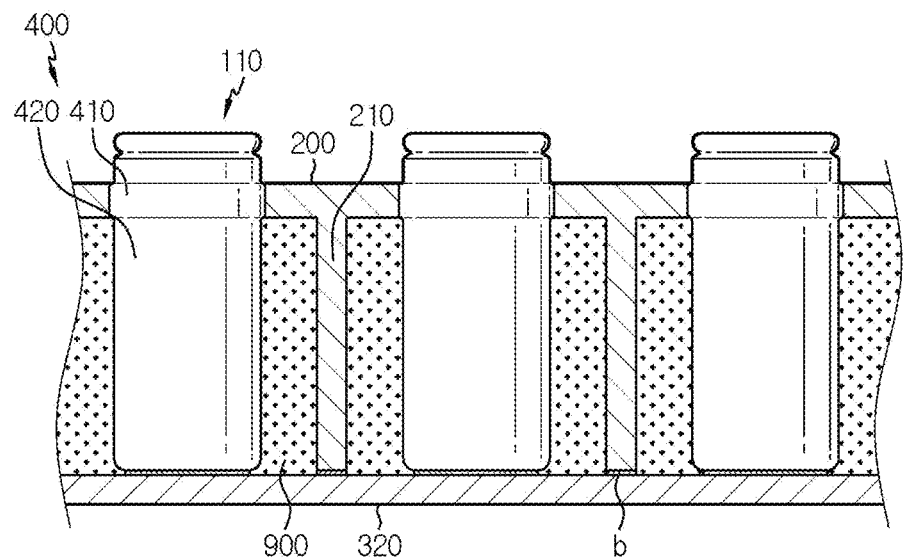
FIG. 3 is a sectional view schematically showing a portion where the secondary battery cell having a protrusion member is coupled to a frame member in a fitting manner in the secondary battery module according to an embodiment of the present disclosure.
Figure 4:
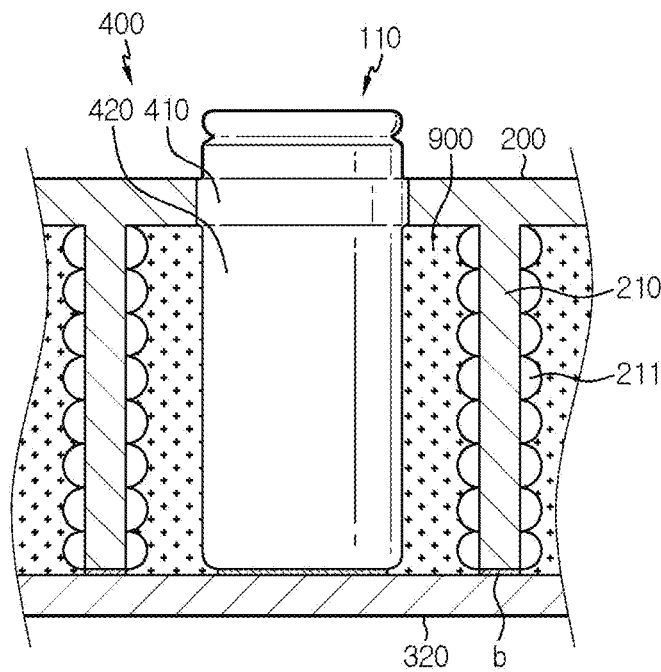
FIG. 4 is a diagram showing that a protrusion is formed on a first rib according to another embodiment of FIG. 3.
Figure 5:
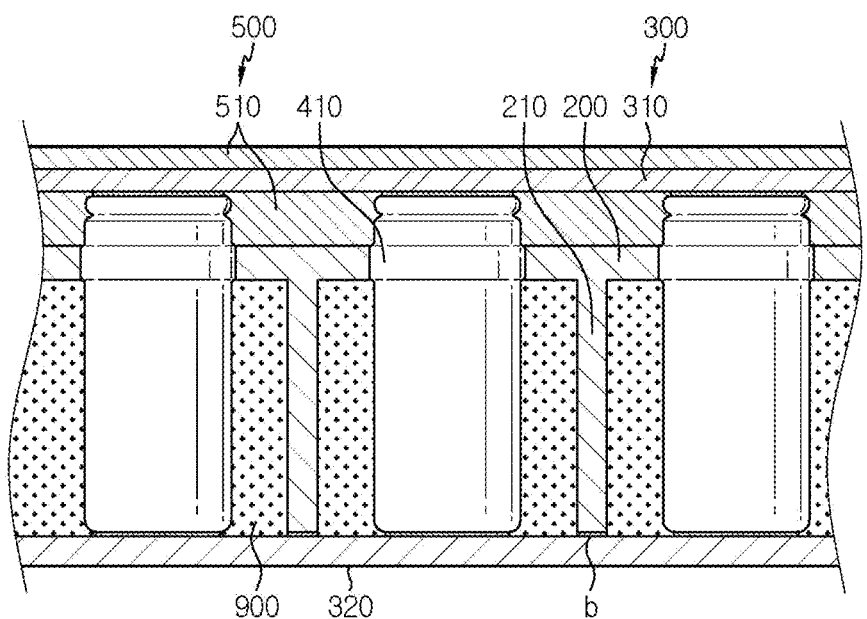
FIG. 5 is a sectional view schematically showing a portion where a waterproofing resin surrounds an upper side of the frame member in the secondary battery module according to an embodiment of the present disclosure.
Figure 6:
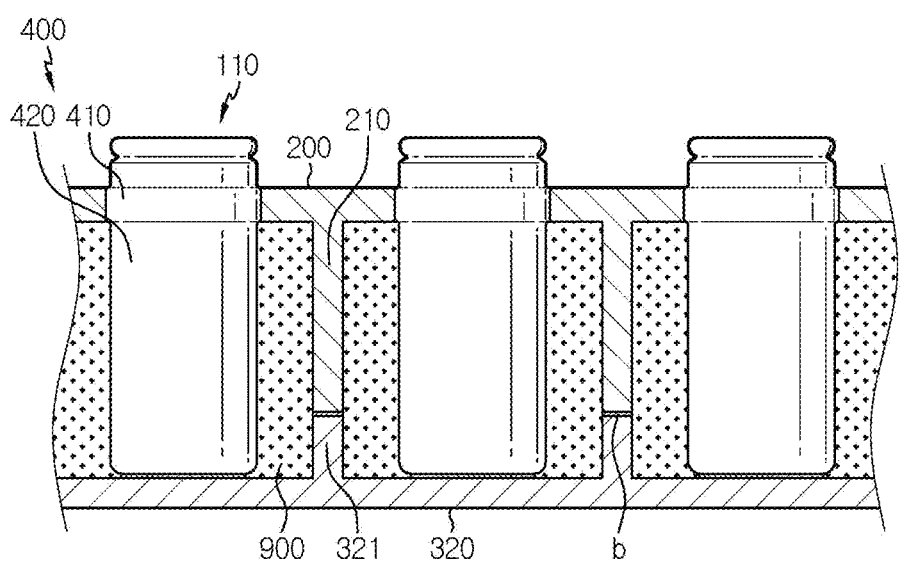
FIG. 6 is a diagram showing that the first rib and a second rib are coupled according to still another embodiment of FIG. 3.
Figure 7:
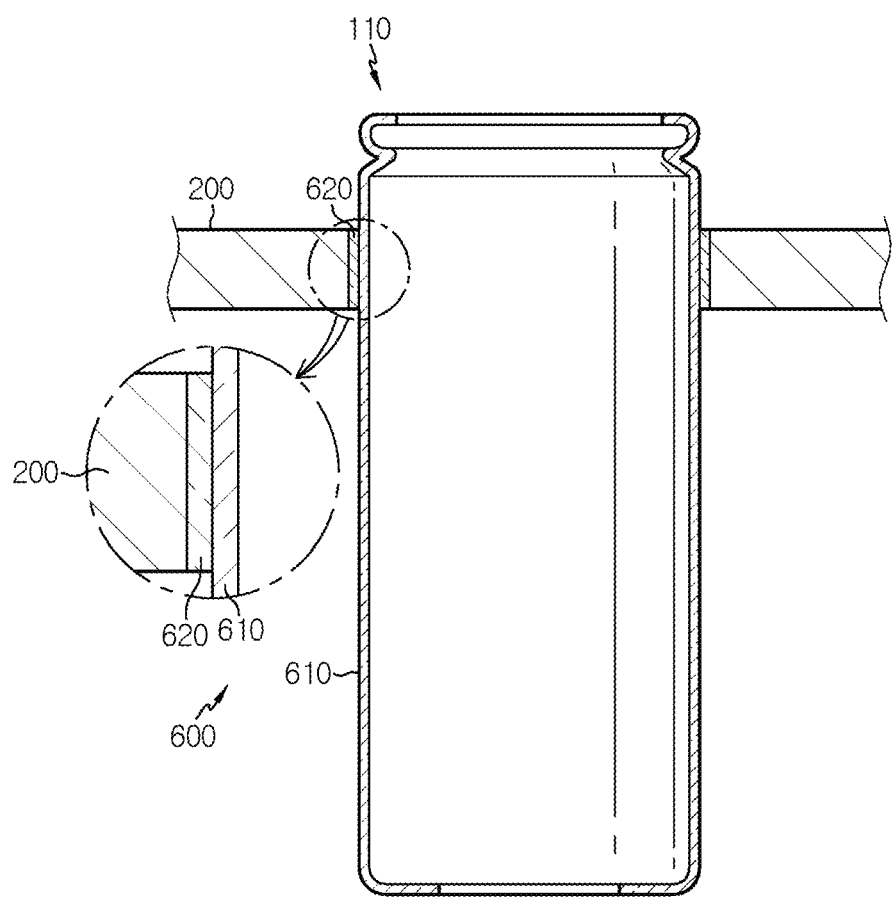
FIG. 7 is a schematic sectional view showing that a waterproofing glue is applied to a tubing member in a secondary battery module according to another embodiment of the present disclosure.
Figure 8:
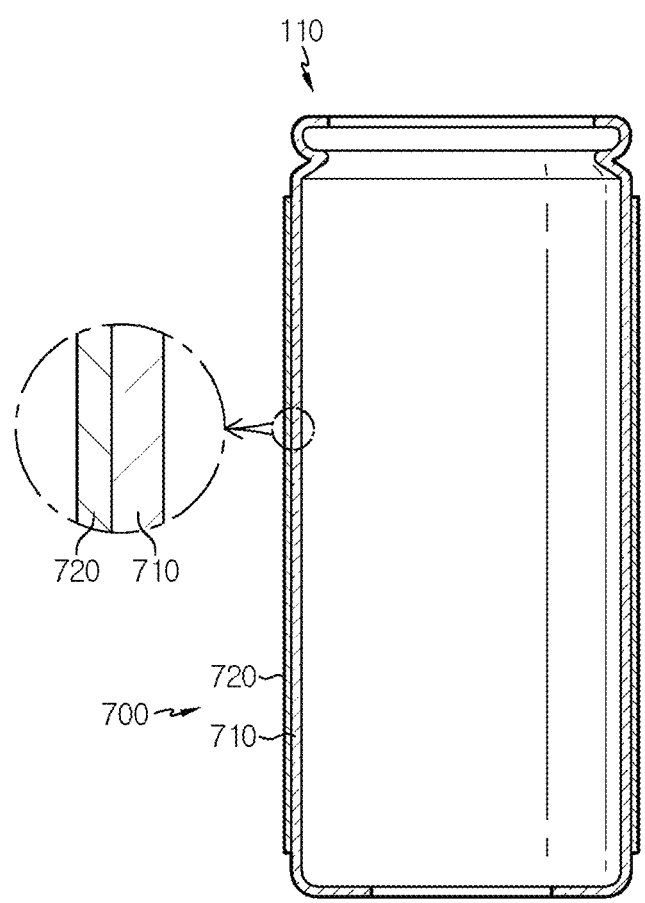
FIG. 8 is a schematic sectional view showing that a metal member is deposited on the surface of the tubing member in a secondary battery module according to still another embodiment of the present disclosure.
Figure 9:
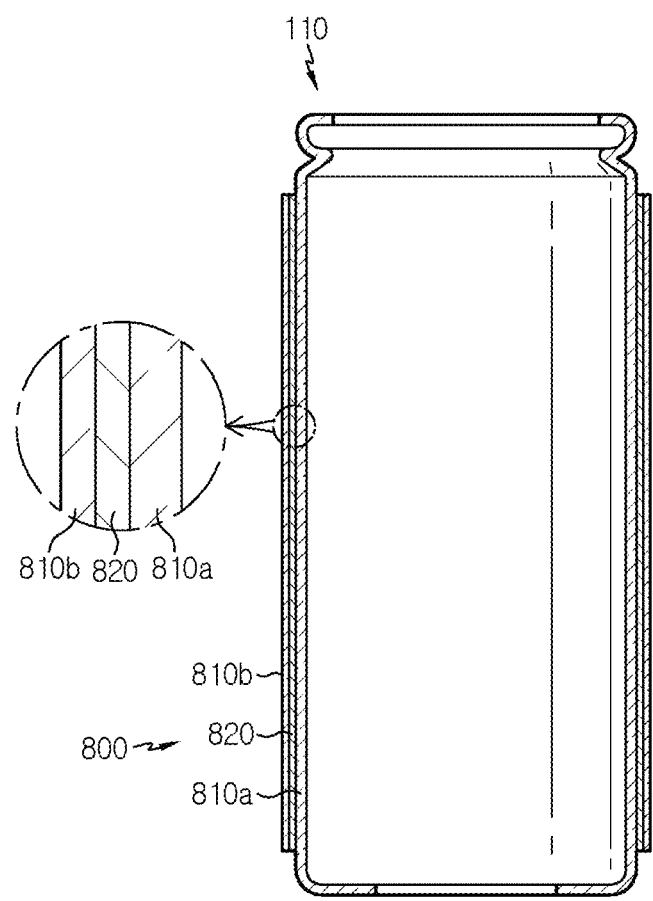
FIG. 9 is a schematic sectional view showing that a metal member is coupled between tubing member in a secondary battery module according to still another embodiment of the present disclosure.

FIG. 1 is an exploded perspective view showing a secondary battery module according to an embodiment of the present disclosure, FIGS. 2(a) to 2(d) are diagrams schematically showing a process in which a protrusion member for waterproofing is formed at a secondary battery cell in the secondary battery module according to an embodiment of the present disclosure, FIG. 3 is a sectional view schematically showing a portion where the secondary battery cell having a protrusion member is coupled to a frame member in a fitting manner in the secondary battery module according to an embodiment of the present disclosure, FIG. 4 is a diagram showing that a protrusion is formed on a first rib according to another embodiment of FIG. 3, FIG. 5 is a sectional view schematically showing a portion where a waterproofing resin surrounds an upper side of the frame member in the secondary battery module according to an embodiment of the present disclosure, FIG. 6 is a diagram showing that the first rib and a second rib are coupled according to still another embodiment of FIG. 3, FIG. 7 is a schematic sectional view showing that a waterproofing glue is applied to a tubing member in a secondary battery module according to another embodiment of the present disclosure, FIG. 8 is a schematic sectional view showing that a metal member is deposited on the surface of the tubing member in a secondary battery module according to still another embodiment of the present disclosure, and FIG. 9 is a schematic sectional view showing that a metal member is coupled between tubing member in a secondary battery module according to still another embodiment of the present disclosure.

Referring to the drawings, a secondary battery module 10 according to an embodiment of the present disclosure includes a plurality of secondary battery cells 100, a frame member 200, and a cover 300.

The secondary battery cell 100 may have various shapes. For example, the secondary battery cell 100 may be cylindrical or rectangular. However, the shape of the secondary battery cell 100 is not limited thereto. Hereinafter, for convenience of explanation, it will be described that the secondary battery cell 100 has a cylindrical shape, but it should be noted that the shape of the secondary battery cell 100 is limited to a cylindrical shape.

In addition, the exterior of the secondary battery cell 100 may be made of various materials having a preset range of rigidity, and, for example, it may be made of various metals. However, the material of the exterior of the secondary battery cell 100 is not limited thereto. Hereinafter, for convenience of explanation, it will be described that the exterior of the secondary battery cell 100 is made of metal, but it should be noted that the material of the exterior of the secondary battery cell 100 is not limited to metal.

The plurality of cylindrical secondary battery cells 100 and the frame member 200 are accommodated in the cover 300. For example, the cover 300 may be provided to surround the plurality of cylindrical secondary battery cells 100 and the frame member 200.

The cover 300 surrounds the whole of the plurality of cylindrical secondary battery cells 100 and thereby protects the plurality of cylindrical secondary battery cells 100 from external vibration or shock.

The cover 300 may be formed in a shape corresponding to the shape of the plurality of cylindrical secondary battery cells 100. However, the present disclosure is not limited thereto.

The cover 300 may be manufactured by, for example, bending a metal plate, or using an injection-molded plastic. In addition, the cover 300 may be manufactured as an integral type, or may be manufactured as a separable type.

The cover 300 may have a perforated portion (not shown) formed therein so that various connector elements or terminal elements may be exposed therethrough to the outside. That is, the connector element or the terminal element may be electrically connected to a predetermined external component or member, and the perforated portion may be formed in the cover 300 so that the electrical connection is not disturbed by the cover 300.

The cover 300 may include an upper cover 310 and a lower cover 320, but is not limited thereto.

A coolant 900 (see FIG. 3) for cooling the plurality of cylindrical secondary battery cells 100 is introduced into the cover 300, for example, into the lower cover 320. To this end, an inlet and an outlet, not shown in the drawings, are formed at the cover 300, and the coolant 900 flows into the lower cover 320 through the inlet to cool the plurality of cylindrical secondary battery cells 100, and then discharges out of the lower cover 320 through the outlet.

For the plurality of cylindrical secondary battery cells 100, a cylindrical secondary battery cell 110 is provided in plural. The cylindrical secondary battery cell 110 is an electrode assembly, for example a jelly-roll type electrode assembly, a cylindrical battery case in which the electrolyte is accommodated together with the electrode assembly, a positive electrode terminal formed at one side of the battery case, for example, and a negative electrode terminal formed at the other side of the battery case, for example.

The electrode assembly may have a structure in which a positive electrode and a negative electrode are stacked with a separator interposed therebetween and wound in the form of a jelly-roll. Also, a positive electrode lead (not shown) is attached to the positive electrode and connected to a positive electrode terminal, for example, at an upper portion of the battery case, and a negative electrode lead (not shown) is attached to the negative electrode and connected to a negative electrode terminal, for example, at a lower portion of the battery case. In addition, a cylindrical center pin (not shown) may be inserted into the center of the electrode assembly.

The positive electrode terminal and the negative electrode terminal provided to the cylindrical secondary battery cell 110 are a kind of terminals exposed to the outside and connected to an external device, and may be made of a conductive material.

The plurality of cylindrical secondary battery cells 100 have a water proofing structure 400. The water proofing structure 400 may have various structures and may be provided to include a protrusion member 410 and a tubing member 420 in an embodiment.

The protrusion member 410 is attached to the cylindrical secondary battery cell 110 and protrudes from the cylindrical secondary battery cell 110. Referring to FIG. 2, the protrusion member 410 may be provided to surround the cylindrical secondary battery cell 110 at an upper side of a side surface of the cylindrical secondary battery cell 110. However, the present disclosure is not limited thereto.

First, the cylindrical secondary battery cell 110 is prepared (see FIG. 2(a)), and the protrusion member 410 is attached to the cylindrical secondary battery cell 110 to protrude from the cylindrical secondary battery cell 110 (see FIG. 2(b)). Then, the tubing member 420 surrounds the cylindrical secondary battery cell 110 to which the protrusion member 410 is attached, and then heat is provided to the tubing member 420 to thermally contract the tubing member 420 (see FIG. 2(c)). After that, the protrusion member 410 attached to the cylindrical secondary battery cell 110 is coupled to the frame member 200 in a fitting manner (see FIG. 2(d)).

That is, the protrusion member 410 coupled to the cylindrical secondary battery cell 110 to protrude therefrom is wrapped by the tubing member 420 and then coupled to the frame member 200 in a fitting manner. Accordingly, a gap between the cylindrical secondary battery cell 110 and the frame member 200 is removed, and the cylindrical secondary battery cell 110 and the frame member 200 are in close contact with each other, thereby giving a waterproof effect.

Here, the tubing member 420 may be PP, PVC, PET, or the like, but is not limited thereto. Hereinafter, the tubing member 420 is also the same.

In addition, since the protrusion member 410 is surrounded and protected by the thermally-contracted tubing member 420, even if the protrusion member 410 is coupled to the frame member 200 in a fitting manner, the position of the protrusion member 410 is maintained without departing from the original position, and deformation is prevented.

The frame member 200 supports the plurality of cylindrical secondary battery cells 100. Referring to FIG. 1, an opening 220 may be formed in the frame member 200, and the frame member 200 is coupled to the plurality of cylindrical secondary battery cells 100 through the opening 220 at the upper side of the plurality of cylindrical secondary battery cells 100. In this case, as described above, the protrusion member 410 of the cylindrical secondary battery cell 110 is coupled to the frame member 200 in a fitting manner.

A first rib 210 protruding in a preset direction may be formed at the frame member 200. In addition, referring to FIG. 3, the first rib 210 is coupled to, for example, the lower cover 320. Here, the first rib 210 and the lower cover 320 may be coupled in various ways, and, for example, may be coupled in a bonding manner (b), without being limited thereto.

Meanwhile, referring to FIG. 6 as another embodiment, the first rib 210 protruding in a preset direction may be formed at the frame member 200, and a second rib 321 corresponding to the first rib 210 may be formed at the lower cover 320. Here, the first rib 210 and the second rib 321 may be coupled. The first rib 210 and the second rib 321 may be coupled in various ways, and, for example, may be coupled in a bonding manner (b), without being limited thereto.

Here, a rib may not be formed at the frame member 200, and the second rib 321 (see FIG. 6) of the lower cover 320 may protrude and be coupled to the frame member 200. The second rib 321 of the lower cover 320 may be coupled to the frame member 200 in various ways, and, for example, may be coupled in a bonding manner, without being limited thereto.

As such, if a barrier is formed by the first rib 210 or the second rib 321 between one cylindrical secondary battery cell 110 and another adjacent cylindrical secondary battery cell 110, the coolant 900 introduced into the cover 300 to cool the plurality of cylindrical secondary battery cells 100 rotates while colliding with the first rib 210 or the second rib 321, thereby generating turbulence.

In addition, if the coolant 900 rotates, the coolant 900 may contact the plurality of cylindrical secondary battery cells 100 at various parts, thereby improving the cooling performance. That is, the barrier described above is formed inside the cover 300 by the first rib 210 formed at the frame member 200 or the second rib 321 formed at the cover 300, and the coolant 900 rotates while colliding with the barrier to contact the plurality of cylindrical secondary battery cells 100 at various parts, thereby improving the cooling performance.

Meanwhile, the barrier formed by the first rib 210 or the second rib 321 not only improves the cooling performance of the plurality of cylindrical secondary battery cells 100 but also has a function of increasing the structural rigidity of the cover 300. Accordingly, when the coolant 900 is injected into the cover 300 or when the waterproof function of the secondary battery module 10 is tested, the waterproof function may be maintained even if a vacuum or high pressure is formed.

Referring to FIG. 4 as another embodiment, a protrusion 211 may be formed on the first rib 210. If the protrusion 211 is formed on the first rib 210 as above, turbulence may be generated more smoothly at the coolant 900 flowing inside cover 300, compared to the case where the protrusion 211 is not formed, so the cooling effect may be further improved. Here, if the second rib 321 is provided, the protrusion 211 may also be formed on the second rib 321.

Referring to FIG. 5, as another embodiment of the water proofing structure 400, namely as another embodiment of the protrusion member 410 and the tubing member 420, the water proofing structure 500 may include a waterproofing resin 510 that surrounds the entire upper side of the frame member 200. The waterproofing resin 510 may be made of various materials that may secure waterproofness.

The protrusion member 410 and the tubing member 420 as well as the waterproofing resin 510 may be provided selectively or in combination, as necessary.

Here, the waterproofing resin 510 may be made of various flame-retardant materials. If the waterproofing resin 510 is made of a flame-retardant material as above to surround all of the plurality of cylindrical secondary battery cells 100 as shown in FIG. 5, when a fire occurs at one cylindrical secondary battery cell 110, it is possible to prevent the flame from spreading to other adjacent cylindrical secondary battery cells 110.

That is, the waterproofing resin 510 of the flame-retardant material does not prevent the occurrence of a flame in the cylindrical secondary battery cell 110, but has a function to prevent flame from spreading when a flame occurs in one cylindrical secondary battery cell 110.

Meanwhile, the waterproofing resin 510 may be made of a phase change material (PCM). The phase change material is a material that absorbs and stores heat when it changes from a solid to a liquid, and releases the stored heat when it changes from a liquid to a solid again. When heat is generated in the cylindrical secondary battery cell 110, the waterproofing resin 510 made of the phase change material may absorb heat generated from the cylindrical secondary battery cell 110 and change into a liquid, thereby cooling the cylindrical secondary battery cell 110.

According to this, the waterproofing resin 510 may have all the effects of waterproofing, preventing flame from spreading, and cooling the cylindrical secondary battery cell 110.

FIG. 7 is another embodiment of the water proofing structure 600, and, referring to FIG. 7, the water proofing structure 600 may include a tubing member 610 and a waterproofing glue 620.

The tubing member 610 is provided to surround the cylindrical secondary battery cell 110. If the tubing member 610 surrounds the cylindrical secondary battery cell 110, heat is provided to the tubing member 610 to thermally contract the tubing member 610.

In addition, the waterproofing glue 620 is a waterproof and adhesive material and is applied to a surface of the tubing member 610. Also, the cylindrical secondary battery cell 110 may be coupled to the frame member 200 through the waterproofing glue 620 as shown in FIG. 7.

FIG. 8 is still another embodiment of the water proofing structure 700, and, referring to FIG. 8, the water proofing structure 700 may include a tubing member 710 and a metal member 720.

The tubing member 710 is identical to that of the former embodiment of FIG. 7 and thus will not be described again.

Here, the metal member 720 is deposited on the surface of the tubing member 710. The metal member 720 may be made of various materials, and, for example, aluminum may be deposited on the surface of the tubing member 710. However, the metal member 720 is not limited to aluminum.

In addition, a waterproof function may be implemented by the metal member 720 such as aluminum deposited on the surface of the tubing member 710.

FIG. 9 is still another embodiment of the water proofing structure 800, and, referring to FIG. 9, the water proofing structure 800 may include tubing members 810a, 810b and a metal member 820.

Here, the embodiment of FIG. 9 is different from the former embodiment of FIG. 8, in that the tubing members 810a, 810b are formed doubly to surround the cylindrical secondary battery cell 110, and the metal member 820 coupled between the tubing members 810a, 810b formed doubly.

Here, the metal member 820 may be coupled to the tubing members 810a, 810b between the tubing members 810a, 810b by an adhesive, thereby enabling waterproofing.

Hereinafter, the operation and effect of the secondary battery module 10 according to an embodiment of the present disclosure will be described with reference to the drawings.

The secondary battery module 10 according to an embodiment of the present disclosure has the water proofing structure 400, 500.

The water proofing structure 400 may include a protrusion member 410 and a tubing member 420. That is, the protrusion member 410 coupled to the cylindrical secondary battery cell 110 to protrude therefrom is wrapped by the tubing member 420 and then coupled to the frame member 200 in a fitting manner to secure waterproofing. Alternatively, the water proofing structure 500 may be provided to secure waterproofing by a waterproofing resin 510 surrounding the entire upper side of the frame member 200.

At this time, the waterproofing resin 510 is made of various flame-retardant materials to prevent flame from spreading to other adjacent cylindrical secondary battery cells 110 when a flame is generated in one cylindrical secondary battery cell 110.

Meanwhile, a secondary battery pack (not shown) according to an embodiment of the present disclosure may include at least one secondary battery module 10 as described above according to an embodiment of the present disclosure. Also, in addition to the secondary battery module 10, the secondary battery pack (not shown) may further includes a case for accommodating the secondary battery module 10, and various devices for controlling charge and discharge of the secondary battery module 10, such as a BMS, a current sensor, a fuse, and the like.

Meanwhile, a vehicle (not shown) according to an embodiment of the present disclosure may include the secondary battery module 10 or the secondary battery pack (not shown) described above, and the secondary battery pack (not shown) may include the secondary battery module 10. In addition, the secondary battery module 10 according to an embodiment of the present disclosure may be applied to the vehicle (not shown), for example a predetermined vehicle (not shown) provided to use electricity such as an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a secondary battery module, and a secondary battery pack and a vehicle including the same, and is particularly available for industries related to secondary batteries.

What is claimed is:

1. A secondary battery module, comprising:
a plurality of secondary battery cells having a battery case in which an electrode assembly and an electrolyte are accommodated;
a frame member supporting the plurality of secondary battery cells; and
a cover accommodating the plurality of secondary battery cells and the frame member,
wherein:
the plurality of secondary battery cells have a water proofing structure;
the cover includes an upper cover and a lower cover;
a rib extends from the frame member near an upper region of a secondary battery cell, protrudes in a vertical direction, and extends to the lower cover;
a gap exists between the rib and the secondary battery cell along an entire length of the rib in the vertical direction and at a position corresponding to a lower end of the secondary battery cell;
the rib is at least one of a first rib, a second rib, or a combination of the first and second ribs; and
the secondary battery cell is one of the plurality of secondary battery cells.

2. The secondary battery module according to claim 1, wherein the water proofing structure includes:
a protrusion member attached to the secondary battery cell to protrude from the secondary battery cell; and
a tubing member surrounding the secondary battery cell to which the protrusion member is attached.

3. The secondary battery module according to claim 2, wherein the tubing member is thermally contracted after surrounding the secondary battery cell and the protrusion member, and
wherein the protrusion member is coupled to the frame member in a fitting manner to secure waterproofing.

4. The secondary battery module according to claim 3, wherein the protrusion member is at an upper side of a side surface of the secondary battery cell to surround the secondary battery cell.

5. The secondary battery module according to claim 1, wherein the first rib is at the frame member and protrudes in the vertical direction, and
wherein the first rib is coupled to the cover.

6. The secondary battery module according to claim 5, wherein a protrusion is on the first rib so that turbulence is generated at a coolant flowing inside the cover.

7. The secondary battery module according to claim 1, wherein the first rib is at the frame member to protrude in the vertical direction, wherein the second rib corresponding to the first rib is at the cover, and wherein the first rib and the second rib are coupled.

8. The secondary battery module according to claim 1, wherein the water proofing structure includes a waterproofing resin that surrounds an upper side of the frame member.

9. The secondary battery module according to claim 8, wherein the waterproofing resin includes a flame-retardant material and surrounds the plurality of secondary battery cells such that, when a fire occurs in any one secondary battery cell, a flame is prevented from spreading to other adjacent secondary battery cell.

10. The secondary battery module according to claim 8, wherein the waterproofing resin includes a phase change material (PCM) to cool the secondary battery cell.

11. The secondary battery module according to claim 1, wherein the water proofing structure includes:
a tubing member surrounding the secondary battery cell; and
a waterproofing glue on a surface of the tubing member.

12. The secondary battery module according to claim 1, wherein the water proofing structure includes:
a tubing member surrounding the secondary battery cell; and
a metal member on a surface of the tubing member.

13. The secondary battery module according to claim 1, wherein the water proofing structure includes:
first and second tubing members each surrounding the secondary battery cell; and
a metal member coupled between the first and second tubing members.

14. A secondary battery pack, comprising the secondary battery module according to claim 1.

15. A vehicle, comprising the secondary battery module according to claim 1.

16. The secondary battery module according to claim 1, wherein:
the gap is continuous along the entire length of the rib in the vertical direction and to the position corresponding to the lower end of the secondary battery cell; and
a size of the gap is constant along the vertical direction.

17. The secondary battery module according to claim 1, comprising:
a waterproofing resin disposed on the upper cover and between the upper cover and the frame member.

* * * * *